Figure 1:
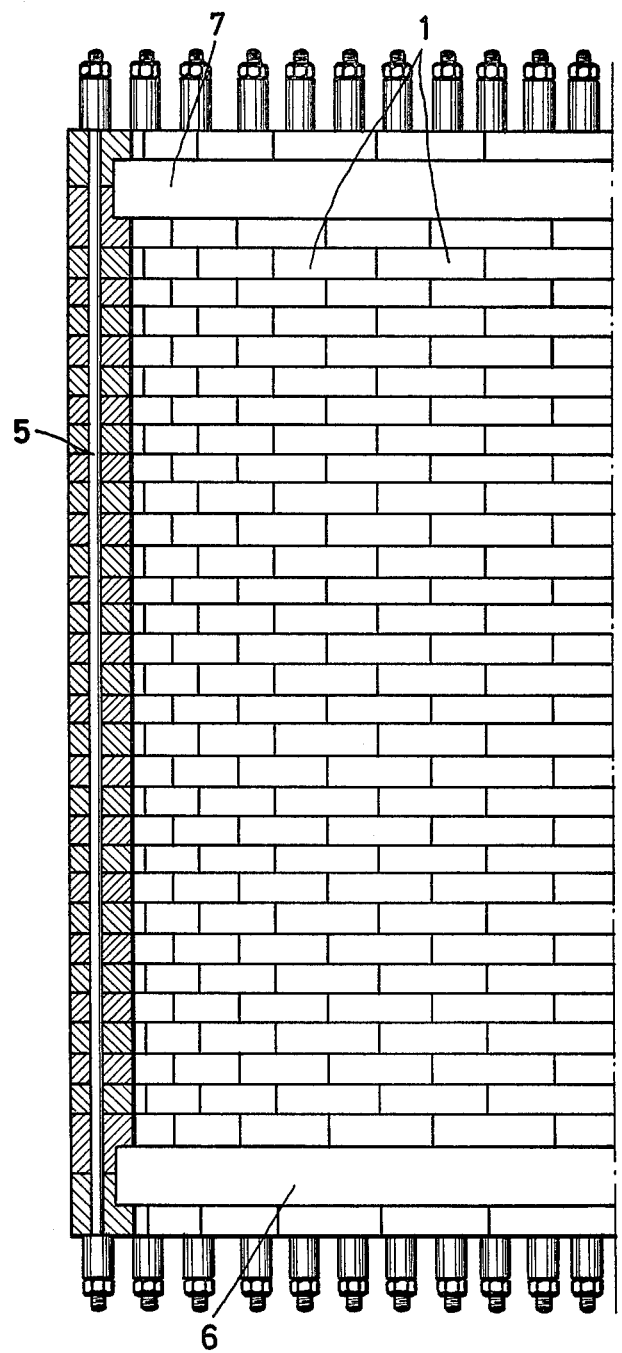

United States Patent [19]

Janakiev

[11] 4,111,327

[45] Sep. 5, 1978

[54] PRESSURE VESSEL

[76] Inventor: Nikolai Janakiev, Frankenring 44, 4150 Krefeld, Fed. Rep. of Germany

[21] Appl. No.: 652,853

[22] Filed: Jan. 27, 1976

[30] Foreign Application Priority Data

Jan. 29, 1975 [DE] Fed. Rep. of Germany ....... 2503511

[51] Int. Cl.² .................... B65D 45/02; B65D 45/32
[52] U.S. Cl. ................................ 220/3; 52/223 R; 52/224; 52/249; 220/5 A; 220/328; 292/256.71; 292/256.73
[58] Field of Search .................... 220/3, 5 A, 71, 327, 220/328, 63 R; 52/224, 223 L, 245, 246, 249, 21, 223 R; 292/256.67, 256.71, 256.73

[56] References Cited

U.S. PATENT DOCUMENTS

| | | | |
|---|---|---|---|
| 1,303,667 | 5/1919 | Holmgreen | 52/249 |
| 2,185,749 | 1/1940 | Kennedy | 52/224 |
| 2,319,105 | 5/1943 | Billner | 52/224 |
| 2,771,096 | 11/1956 | Ver Nooy | 220/327 |
| 2,797,948 | 7/1957 | Tangard | 220/378 |
| 3,256,069 | 6/1966 | Peterson | 220/3 |
| 3,433,382 | 3/1969 | Boggio | 220/3 |
| 3,478,920 | 11/1969 | Pechacek | 220/3 |
| 3,568,385 | 3/1971 | Craset et al. | 52/224 |
| 3,710,526 | 1/1973 | Parks | 52/223 R |
| 3,734,827 | 5/1973 | Schilling | 220/3 |
| 3,764,039 | 10/1973 | Jorgensen | 220/3 |

*Primary Examiner*—William Price
*Assistant Examiner*—Allan N. Shoap
*Attorney, Agent, or Firm*—Cushman, Darby & Cushman

[57] ABSTRACT

The cylindrical body of a pressure vessel for use as a reaction vessel, is built up from courses of flat circularly arcuate segmental plates, the courses being located with respect to each other by locating means passing through aligning openings in the plates. To facilitate construction the openings in each plate are disposed in a symmetrical pattern or array. The locating means may be pins or preferably sleeves, and prestressing means for holding the courses together may be provided by tie-rods or cables passing through such sleeves and also possibly through openings not taken up by locating means. The floor and/or cover of the pressure vessel may be double-walled, and prestressing means provided within the double walls for tightly securing the floor and/or cover to the inside of the cylindrical wall.

5 Claims, 6 Drawing Figures

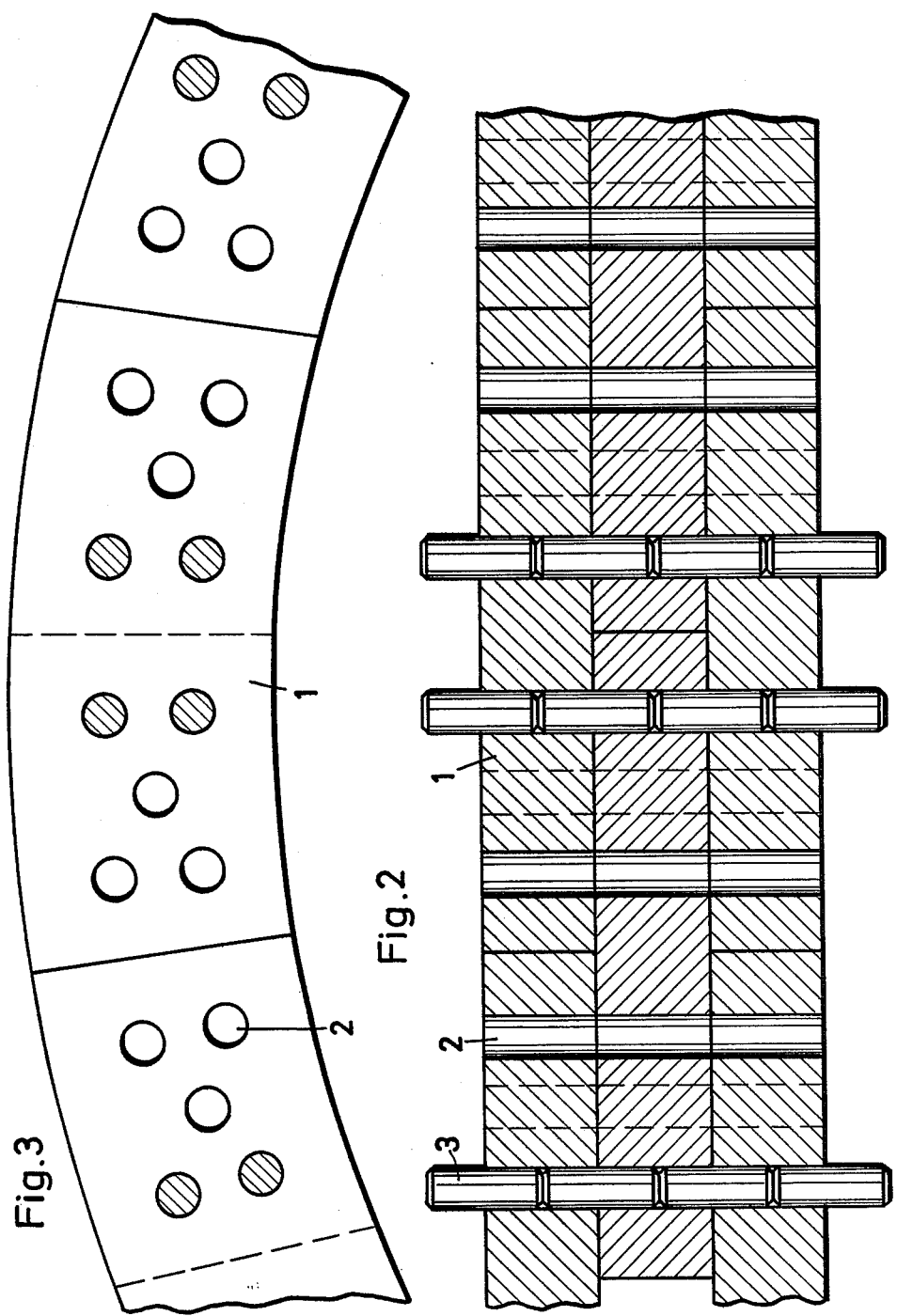

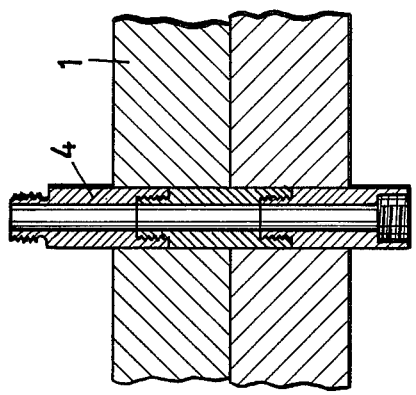
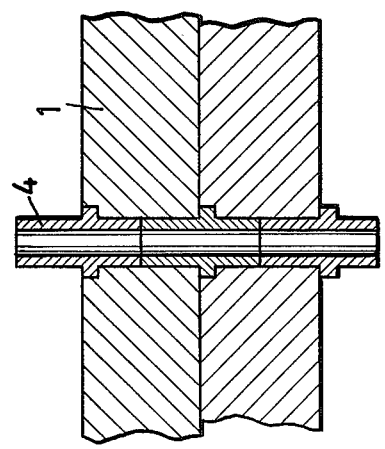
Fig. 4

PRESSURE VESSEL

This invention relates to a pressure vessel of the type comprising a cylindrical body consisting of a plurality of separate elements, a floor and a cover.

High pressure containers and vessels are required in the chemical industry, e.g. in petrochemical plant, and in the nuclear energy field for use as reactors and/or for other purposes. In order to withstand the ring stress due to the pressures inside such vessels, their walls are strengthened by prestressing. Thus such pressure vessels are conventionally made of prestressed concrete, or constructed as an assembly of cast iron wall segments which are prestressed peripherally by wedges, and axially and horizontally by tensioning cables.

The object of the present invention is the provision of a pressure vessel which is simpler and easier to manufacture and erect than hitherto.

The invention provides a pressure vessel consisting essentially of a floor, a cover and a wall, wherein the said wall is formed from courses of flat circularly arcuate segmental plates axially traversed by openings disposed in a symmetrical pattern or array.

It is preferred that the thickness of the plates is less than their radial width. In a particularly suitable arrangement the peripheral ends of the plates in each course overlap the ends of the plates in an adjacent course, preferably to form a half plate bond.

In a preferred embodiment of the pressure vessel according to the invention, locating elements, e.g. pins, sleeves and/or tierods, or tensioning cables or wires, extend through axially aligning openings in the laid plates. If desired a single or double walled, prestressed floor and/or cover, which may be prestressed, may be inserted between suitably formed wall plates. Such a double walled floor and/or cover may contain radially tensioned elements e.g. cables, wires, ropes or rods of which one end is anchored to or in suitably formed wall plates, their other end being secured inside the floor and/or cover in a manner permitting them to be tensioned to a desired degree of prestress. Centrally between the parallel slabs forming the floor and/or cover a cylindrical ring may be provided having an axial length equal to the spacing of the slabs and containing holes in its periphery for the passage therethrough of the said tensioning elements.

Figure 5:
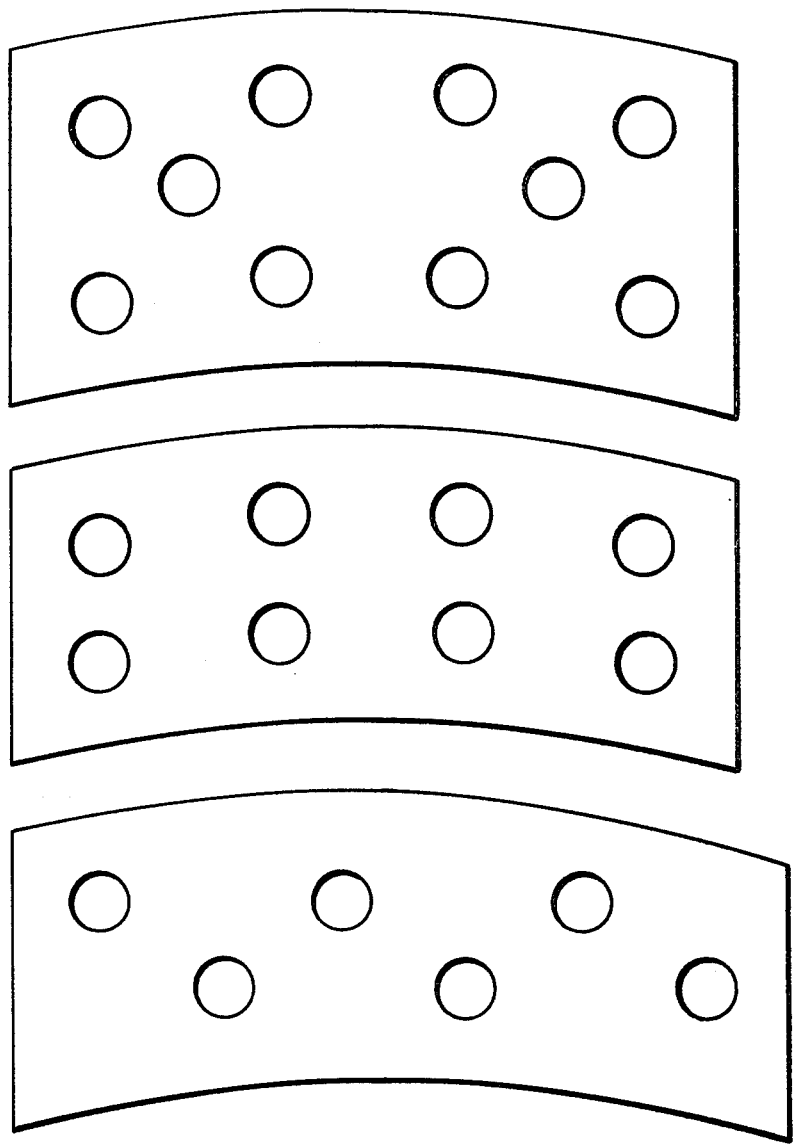
Figure 6:
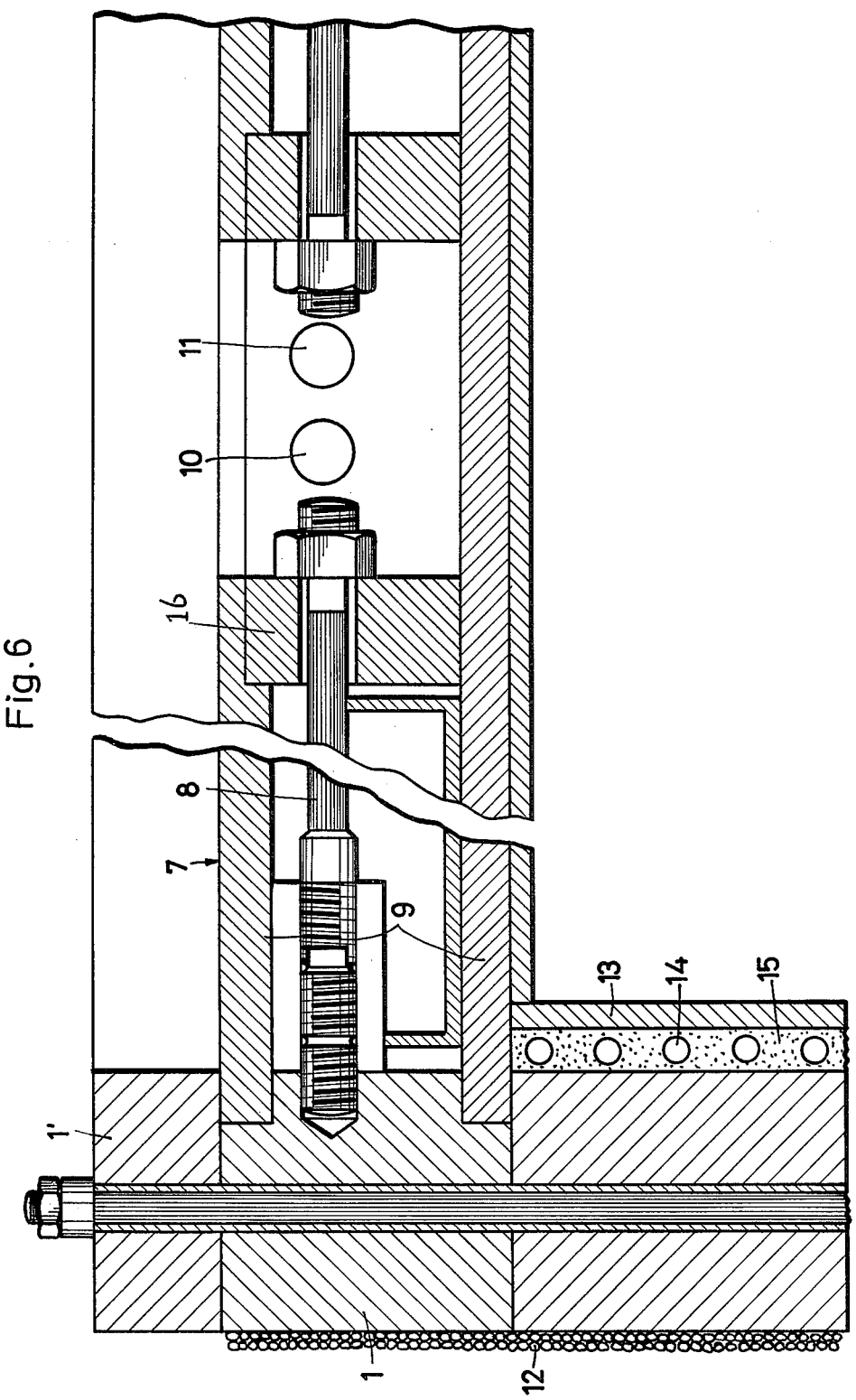

The invention is hereinafter more particularly described and illustrated in the accompanying drawings, of which FIG. 1 is a partial longitudinal section schematically illustrating the general construction of one embodiment of a pressure vessel according to the invention, FIG. 2 is a elevational view of a portion of the wall of the vessel of FIG. 1, FIG. 3 is a view of the same portion in plan view, FIG. 4 are examples of the method of connecting together consecutive courses of wall plates, FIG. 5 shows a selection of symmetrical patterns or arrays of openings in plates with symmetrically disposed holes, and FIG. 6 is a longitudinal section of the tensioning members and the connection between the cover and/or bottom of the vessel and its side wall as well as of other details and possible ways of constructing a pressure vessel according to the invention.

Referring to FIG. 1, the circular wall consists of flat circularly arcuate segmental plates 1 which are laid in consecutive courses in the manner of brickwork, the ends of the plates 1 in each course overlapping the ends of those of an adjacent course, preferably in the form of a half plate bond, as will be understood from FIG. 1. The pressure vessel also comprises a floor 6 and a cover 7 which may be constructed in a manner hereinafter described.

The segmental plates 1 are traversed in the axial direction by openings, e.g. holes 2, disposed in a symmetrical pattern as shown in FIGS. 2 and 3. These holes 2 may form diverse patterns or arrays in the plates 1. Examples of such patterns or arrays are illustrated in FIG. 5. It is however important that the patterns or arrays formed by the holes 2 should be identical in all the plates 1, so that when the plates are laid in consecutive courses for building the wall some holes 2 will always be in alignment to permit tensioning cables 5 or the like tensioning means to be pulled axially through the plates from one end of the vessel to the other.

The holes 2 are also used for the reception of locating pins 3 as illustrated in FIGS. 2 and 3, or locating sleeves 4 as illustrated in FIG. 4, which permit the plates 1 in each course to be located as required in relation to the plates in the next course above and below. The pins facilitate assembly besides providing supplementary radial stiffening means. The use of sleeves 4 has the advantage over pins 3 in that they permit the tensioning cables or tie-rods 5 to be pulled through their interiors. When locating pins 3 are used, as illustrated in FIG. 2, the tensioning cables or tie-rods 5 must be pulled through axially aligning holes 2 which contain no locating pins 3.

The object of the symmetrical disposition of the holes 2 which axially traverse the segmental plates 1 is to enable the plates to be bonded by laying them in positions of relative overlap between consecutive courses in which holes in the plates will axially align to provide continuous channels through the entire wall for the reception of tensioning cables or tie-rods 5 to permit the wall to be prestressed.

It has been found that the stability of a vessel wall constructed of the described segmental plates 1 is a maximum when the radial width 4 of the plates 1 exceeds their thickness as shown for example in FIGS. 2 and 3.

The pressure vessel according to the invention may be provided with a single or a double walled, bottom 6 and/or cover 7 insertable in a plate course, i.e. between suitably shaped wall plates 1'. An example is shown in FIG. 6.

In the portion of the vessel shown in FIG. 6 the segmental plates forming the wall are indicated at 1. These are embrced in an external sheath of closely wound tension wires 12 which are useful in cases in which extremely high internal pressures must be contained. Internally they are provided with a sheet steel liner 13. Besides the possible provision of cooling tubes 14 between the wall and the liner this space is filled with a backfilling 15 of synthetic material synthetic resin or mixtures with or compounds of such materials.

In the embodiment illustrated in FIG. 6 the cover 7 consists of two flat parallel walls 9. The outer edge of these floor walls are fitted in a course into specially shaped segmental plates 1'. For prestressing this vessel cover 7 in a manner that can be correspondingly adopted for the vessel floor 6, not shown, a cylindricl ring 16 may be provided in the middle between the two flat parallel floor walls 9, the axial length of this ring corresponding to the width of the space between the two slabs 9. At intervals around its periphery the ring is provided with radial holes 10,11 for the reception of the ends of prestressing elements e.g. tensioning cables 8, wires, rods or ropes radiating from the centre to the vessel periphery. The outer ends of the tensioning cables 8 are anchored to or in the wall plates 1', whereas their inner ends are secured on the inside of the ring 16, from which end the cables 8 can be tensioned. Alternatively the outer ends of the tensioning cables could be arranged to pass through the wall elements 1' and thus arranged to be tensioned from the outside of the vessel.

What is claimed is:

1. A pressure vessel comprising: a cylindrical wall formed of courses of a plurality of flat circularly arcuate segmental plates each plate being axially traversed by a plurality of openings disposed in a symmetrical pattern or array at least some of the holes in adjacent courses being in alignment, and wherein the ends of the plates in each course overlap the ends of the plates in an adjacent course, and wherein locating sleeves are inserted in said aligned openings, and through each of the said locating sleeves prestressing means selected from a tensioning cable and a tie rod is extended and is secured at the top and the bottom of said wall; a double-walled floor extending across said cylindrical wall inserted in a said course adjacent the bottom, said double-walled floor containing a prestressing element radially extending from a said wall plate to securing means in said floor and adjustable tensioning means for adjusting the tension in said prestressing element; and a double-walled cover extending across said cylindrical wall adjacent said top.

2. A pressure vessel as in claim 1 wherein said double-walled floor contains a ring fitting between the walls of said double-walled floor, said ring having apertures around the periphery for the passage therethrough of said prestressing element.

3. A pressure vessel comprising: a cylindrical wall formed of courses of a plurality of flat circularly arcuate segmental plates each plate being axially traversed by a plurality of openings disposed in a symmetrical pattern or array at least some of the holes in adjacent courses being in alignment, and wherein the ends of the plates in each course overlap the ends of the plates in an adjacent course, and wherein locating sleeves are inserted in said aligned openings, and through each of the said locating sleeves prestressing means selected from a tensioning cable and a tie rod is extended and is secured at the top and the bottom of said wall; a double-walled floor extending across said cylindrical wall inserted in a said course adjacent the bottom; and a double-walled cover extending across said cylindrical wall adjacent said top, said double-walled cover containing a prestressing element radially extending from a said wall plate to a securing means in said cover, and adjustable tensioning means for adjusting the tension in said prestressing element.

4. A pressure vessel as in claim 3 wherein said double-walled cover contains a ring fitting between the walls of said double-walled cover, said ring having apertures around its periphery for the passage therethrough of said prestressing element.

5. A pressure vessel comprising: a cylindrical wall formed of courses of a plurality of flat circularly arcuate segmental plates each plate being axially traversed by a plurality of openings disposed in a symmetrical pattern or array at least some of the holes in adjacent courses being in alignment, and wherein the ends of the plates in each course overlap the ends of the plates in an adjacent course, and wherein locating sleeves are inserted in said aligned openings, and through each of the said locating sleeves prestressing means selected from a tensioning cable and a tie rod is extended and is secured at the top and the bottom of said wall; a double-walled floor extending across said cylindrical wall inserted in a said course adjacent the bottom; a double-walled cover extending across said cylindrical wall adjacent said top, at least one of said double-walled floor and double-walled cover including first and second coextensive walls spaced-apart along the axis of the presure vessel, said walls having circular edges abutting plates in said cylindrical wall; a ring disposed concentric with and between said first and second walls, said ring abutting at least one of said first and second walls; and a plurality of tensioned prestressing elements radially extending from said cylindrical wall to said ring.

* * * * *